United States Patent [19]
Schaefer

[11] Patent Number: 5,841,737
[45] Date of Patent: Nov. 24, 1998

[54] SPARKER SOURCE SYSTEMS

[76] Inventor: Raymond B. Schaefer, 11 Inverness Rd., Arlington, Mass. 02174

[21] Appl. No.: 896,221

[22] Filed: Jul. 17, 1997

[51] Int. Cl.$^6$ .................................................. G01V 1/157
[52] U.S. Cl. .......................................................... 367/147
[58] Field of Search ........................... 367/147; 181/105, 181/106, 104

[56] References Cited

U.S. PATENT DOCUMENTS

| | | | |
|---|---|---|---|
| 4,651,311 | 3/1987 | Owen et al. | 367/147 |
| 4,734,894 | 3/1988 | Cannelli et al. | 367/147 |

OTHER PUBLICATIONS

Barger et al., "The air gun impulsive underwater transducer", J. Acoust. Soc. Am. 68(4), pp. 1038–1045 (Oct. 1980).

Cathignol et al., "Influence of Water Conductivity on the Efficiency and The Reproductivity of Electrohydraulic Shock Wave Generation", Ultrasound in Medicine and Biology, vol. 17, No. 8 (1991).

Caulfield et al., "Improvements in the Continuous Seismic Profiler", Manuscript from Woods Hole Oceanographic Institution, Woods Hole, MA, Contribution No. 1494 (received by editor May, 1964).

Cole, "Underwater Explosions" Table of Contents, Dover Publications, New York, NY (1948).

EG&G Marine Instruments Brochure, Bulletin 2–100A (1977).

Frungel, "High Speed Pulse Technology", Capacitor Discharges–Magnetohydrodynamics–X–Rays–Ultrasonics vol. I, Academic Press (1965).

*Primary Examiner*—Daniel T. Pihulic
*Attorney, Agent, or Firm*—Iandiorio & Teska

[57] ABSTRACT

An impulsive acoustic radiation source includes an enclosure disposed about an impulse generator to control the generated acoustic spectrum. In some implementations, the impulse source includes electrically nonconducting materials disposed so as to provide a compact means to complete the electrical circuit. In certain implementations, the impulse source includes a restrictor that mechanically guides a "cavity" produced by the pulsed electrical discharge. In other implementations, multiple impulse sources are disposed within an enclosure having walls or other means to define an enclosure for each specific source. Arrangements of multiple impulse sources connected in series and driven by a single circuit and having a reflector disposed about the impulse source or sources are disclosed. In certain implementations, the impulse source is initiated by a small energy electrical discharge that, in a particularly favored implementation, employs an electrode configuration having an initiator electrode in addition to the main electrodes. Also, an impulse source located adjacent to a pulse power subsystem is disclosed.

36 Claims, 6 Drawing Sheets

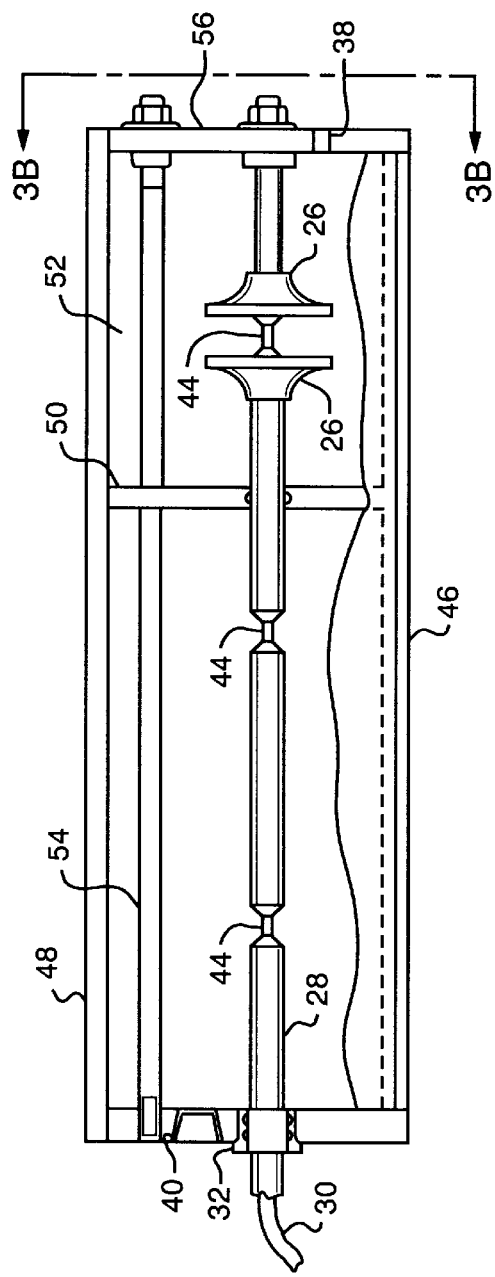
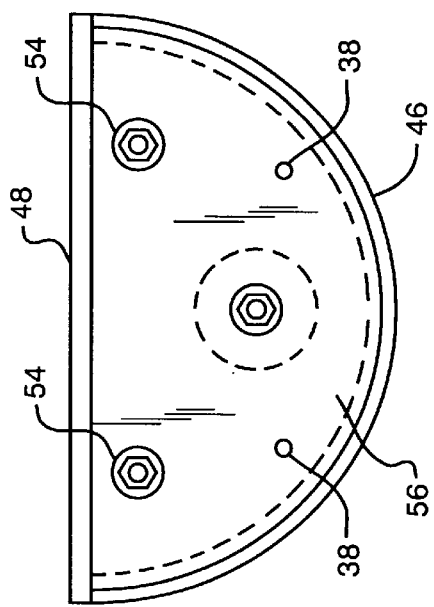
FIG. 3A
FIG. 3B

SPARKER SOURCE SYSTEMS

BACKGROUND OF THE INVENTION

The present invention relates to high intensity impulsive sources in liquids and the like.

When submerged in liquids, impulsive sources produce strong pulsed pressure oscillations, important in a wide variety of commercial, industrial, academic, medical and environmental applications.

A variety of impulsive sources are known in the art. For example, explosives are strong and efficient impulsive sources but are, however, limited to a single pulse per explosion. Furthermore, because of safety concerns and environmental laws and regulations, explosives are not widely used. Air guns using compressed air are another impulsive source, but they are relatively inefficient and difficult to control spectrally, and, thus, have had limited use.

A more efficient alternative to air guns is a sparker source (or sparkers). Sparkers produce pulses of electrical energy that are deposited into a liquid to generate an impulse. Sparker sources have the capability of being pulsed repetitively and have found commercial application in oil exploration and lithotripsy. Applications in oil exploration depend on both the characteristic high pressure "impulse" as well as the corresponding acoustic spectrum of the impulse. Sparkers also produce a plasma that enables the sparker to act as a light source. When operated in water, sparkers also initiate the production of OH radicals electrons, ions and ultraviolet light that, when combined with the generated pressure pulses, are useful for processes such as decontamination, disinfection and the treating of organically contaminated water.

Similar to other impulsive sources, sparker sources have a broadband acoustic spectrum and provide limited acoustic spectral control. The strength and peak frequency of the acoustic spectrum are inter-related with the ambient pressure. For example, if one specifies the acoustic strength for an impulsive source at a given depth (that is, at a particular ambient pressure) in a body of liquid, then the peak frequency is also determined. Furthermore, the spectral width of the acoustic spectrum is only partially controllable and is accompanied by large changes in the efficiency of the impulsive sources. In particular, narrowing the acoustic spectrum results in a large loss in overall efficiency. In addition, prior impulsive sources of which I am aware produce different spectra at different depths.

For prior sparkers of which I am aware, the various electrode systems that initiate the impulse have various limitations. In one case a cage surrounding the main electrode slows the circuit turn-on time. In another, an annular electrode configuration damages easily. In yet another, the ocean is employed as the current return which leads to large energy losses.

Sparker sources by their nature are omnidirectional, so in applications with an intended target region, acoustic energy is wasted. Moreover, in processes which utilize a sparker enclosed in a chamber, energy propagating through the chamber wall is wasted as well.

Other applications utilize arrays of impulsive sources to provide directionality of the acoustic waveform. Each sparker of an array has a separate electrical driver which results in large and heavy systems.

In certain applications, sparkers are submerged in liquids with high electrical conductivity, for example, ocean water. The high conductivity of the liquid results in large energy loss during initiation of the electrical discharge with a corresponding reduction in efficiency.

In typical ocean sparker sources, the electrical pulse power system is located on a ship and the pulse power is delivered down a cable to the sparker deployed in the water. This results in significant energy loss in the cable and the initiation process also is affected by an increase in electrical risetime.

SUMMARY OF THE INVENTION

The efficacy of the sparker in an application depends on the selection of a sparker source based upon its output spectral characteristics and the efficiency of the source in generating the impulse. Furthermore, most applications require that the source be capable of generating multiple pulses. I have realized it is possible to provide means to tune the acoustic spectrum of the impulsive source, in addition to efficiently producing a single impulse or multiple impulses.

These and other advantages of the present invention are achieved by electrodes disposed in full or partial enclosures. In preferred forms multiple sets of electrodes are employed, enclosures or other devices serve as restrictors that shape the impulse and power sources are located adjacent to the electrode. Acoustic reflectors and low energy initiators for each sparker are also advantageously employed.

In general, in a sparker source, a pulse of electrical energy produces a strong initial pressure peak. After the first pressure peak, a high pressure "cavity" remains that expands and contracts, producing a second large pressure peak followed by smaller pressure peaks as each subsequent cavity collapses. For sparkers known in the art the peak frequency in the acoustic spectrum is determined by the time between the first two pressure peaks. One aspect of the invention related to frequency control is to place the electrodes inside a full enclosure or "pod". The cavity expansion increases the pressure in the pod which in turn reduces the cavity size thereby reducing the time between the first two pressure peaks, and thus increasing the corresponding frequency. For a "soft pod", i.e., a pod with a relatively soft wall, hence a low spring constant, the acoustic spectrum is shifted to a higher frequency. For a "hard" pod, i.e., a pod with relatively hard walls and a higher spring constant, the cavity oscillations diminish, and a relatively long pressure pulse is produced. This shifts the acoustic spectrum to a lower frequency. The efficiency and spectrum of a "hard" pod is independent of depth, thereby removing one of the key limitations of prior sparkers of which I am aware.

The "pod" enclosure in the preferred arrangements are any of various geometrical shapes that depend on the desired application and the number of sparkers. For instance, the enclosure may be spherical for a single set of electrodes or cylindrical for multiple sets of electrodes, according to two particularly preferred arrangements. The enclosure material and construction dimensions are chosen to produce the desired peak acoustic spectral frequency, consistent with the mechanical integrity of the material associated with the impulses from the sparker(s).

A second aspect of the invention with respect to frequency control is to partially enclose or enshroud the sparker electrodes with a restrictor in such a way as to geometrically control the growth of the cavity. This alters the spherical symmetry of the cavity growth. The spherical symmetry of the cavity growth is what determines the peak frequency in sparkers known in the art. The alteration of the symmetrical growth narrows the acoustic spectrum without a loss in efficiency. The restrictor may be any of various geometrical shapes, depending on the sparker geometry and on the desired output. For instance, the restrictor in certain arrangements consists of two discs of a cylindrical sparker to force the cavity to expand and contract cylindrically, or in another arrangement, a rectangular tube is employed in a rectangular sparker to force the cavity to move linearly. The restrictor material and construction dimensions are chosen to produce the desired acoustic spectral peak frequency and bandwidth.

In certain arrangements, the restrictor and enclosure concepts are used together or singly, depending on the spectral control requirements of the application.

For systems with multiple sparkers, each sparker may have a separate enclosure, or share a single enclosure, with or without walls to partition the enclosure into separate volumes. Also, each sparker may have a different restrictor or no restrictor. These arrangements determine the spectral properties of the array. When the enclosure provides the spectral control, and it is desired for each sparker to operate with a different peak frequency, then the pod volume and materials associated with each sparker are chosen accordingly. In arrangements in which each sparker has a separate electrical driver, each sparker has the capability of being fired independently. This provides further control of the acoustic spectrum, through both the timing/sequencing of triggering and, if the sparkers share a common pod, the interaction among sparkers. The use of the pod and/or restrictor allow one to specify both the strength and peak frequency and to control the spectral width while increasing the efficiency. And, in some instances, the acoustic spectra is independent of depth of the sparker in the liquid medium.

According to another aspect of the invention, multiple sparkers operate with a single electrical driver, with the sparkers arranged in series (electrically). This both reduces the number of electrical drivers and increases the efficiency of transferring stored electrical energy to the sparkers. The sparkers are connected by an insulated cable that, in one preferred arrangement, is a co-axial cable in which the central conductor serves as the current return.

In other arrangements, acoustic and light reflectors are positioned and shaped so as to redirect acoustic energy in a useful manner. The reflector is either a separate arrangement or is an integral part of an enclosure or processing chamber. In certain arrangements, the reflector is associated with individual sparkers, but in other arrangements with an entire array of sparkers. In one preferred arrangement the acoustic output from an array is reflected to form, in effect, a second array (i.e., a two dimensional array).

In high conductivity liquids, e.g. ocean water, sparker initiation is slow, so that a large quantity of energy is expended to form a low conduction path for the electrical discharge. To reduce the energy loss during initiation, the invention in a particular arrangement has two electrical circuits. In one preferred arrangement, the first circuit pulses at low energy for initiation and, after an appropriate delay, the second circuit pulses at high energy to produce the pressure pulse. In the first discharge a small quantity of electrical energy is deposited into the sparker, creating a disturbance that grows between the electrode gap(s). Once the disturbance has prepared the liquid, a second discharge produces the impulse.

The invention includes an electrode system that allows for rapid turn-on, is robust mechanically and minimizes electrical energy losses. The sparker implementation configuration may have any of several alternative geometries. In a standard coaxial geometry the same two electrodes serve for both initiation and the main discharge. An alternative preferred geometry employs a third electrode to serve as the initiator. The initiation occurs at a "middle" electrode and the disturbance propagates toward the two main discharge electrodes. The initiating electrode and electrical circuit are also, in certain arrangements, designed to produce a corona that aids initiation. A preferred arrangement utilizes the same charging voltage for both discharges and is in the (one to ten) kilovolt range. According to the present invention, the sparker source operates at low voltages which are especially important for compact sparker sources such as those deployed in buoys. In one alternate arrangement a peaking capacitor serves as the initiator. In another alternate arrangement, the "first" discharge circuit provides a constant direct current that establishes a low resistance path for the second discharge.

Also, according to another aspect of the invention, the pulse power subsystem is located adjacent to the sparker to reduce resistive losses in the cable and to improve sparker initiation. The pulse power subsystem is charged by either a power system on a ship or by an energy storage device (e.g., battery) located at the same depth of the sparker.

Accordingly, the general purposes of the present invention are to provide independent control of the acoustic spectrum and strength, robust and efficient sparker electrodes, sparker systems that efficiently utilize the impulse and have directionality, compact sparker arrays, and sparker sources that are efficient in high conductivity liquids, operate at low voltage, and efficiently transfer electrical power to the sparker.

The inventive impulsive source is amenable for use in a wide variety of industrial, commercial, academic, medical and environmental applications such as geophysical exploration (for example, subbottom or underground profiling), pressure treating, lithotripsy, anti-biofouling, underwater surveillance, sonobuoys, shallow water characterization, disinfection, destruction of organic compounds, for instance in industrial waste, groundwater and water supplies, and the like.

Important aspects of the invention will now be summarized.

In an aspect, a sparker source for use with a liquid medium is provided. The sparker source includes a plurality of spaced electrodes, an electrical driver constructed to generate electrical discharges in the medium between the electrodes, in which each discharge is adapted to generate an impulse of acoustic energy. An enclosure having a spring constant defining the rigidity of the enclosure is constructed to enclose the electrodes and the liquid medium to control the acoustic spectrum of the impulse.

One or more of the following may also be included: An initiator electrode constructed to initiate the discharge between the electrodes may be included. There may be a nonconducting substrate disposed between the electrodes to provide a surface along which the discharge occurs. The sparker source may be adapted for submersion in another liquid medium. The enclosure may be sealed to isolate the liquid medium inside the enclosure from the other liquid medium. The enclosure may be have an acoustic impedance matched to the other liquid medium. Or the impedance may be mismatched with the other liquid medium.

The spring constant of the enclosure may be between 0.1 and 10,000,000. The enclosure may have a spring constant between 1 and 100 or between 100 and 10,000. Or the spring constant may be between 10,000 and 10,000,000 and the acoustic spectrum may be independent of any external pressure imposed on the enclosure by a fluid in which the sparker source is immersed. The enclosure may enable the sparker source to operate at lower acoustic frequency and lower energy than would occur in the absence of the enclosure.

The electrical driver may include an initiator circuit and a separate discharge drive circuit. The initiator circuit may enable the electrical driver to produce a lower voltage, efficient electrical discharge than would occur in the absence of the initiator circuit. The liquid medium in which the electrodes are immersed may be a high electrical conductivity liquid medium. The electrical driver may be located adjacent to the electrodes.

The enclosure may be a spherical pod, or the enclosure may be cylindrical. The sparker source may include a plurality of sets of electrodes.

The sparker source may have a reflector arranged with the enclosure, in which the reflector is constructed to direct the acoustic energy in a desired direction. The enclosure may include a light-transmissive window constructed to transmit light produced by the discharge, preferably in a desired direction.

The sparker source may have a plurality of enclosures, each of which encloses at least a pair of the plurality of electrodes.

The enclosure may enclose a compliant medium. The sparker source may have at least one restrictor disposed in the vicinity of the electrodes to control the geometric shape and spatial growth of the impulse produced by the electrodes. At least one enclosure may be constructed and arranged with respect to the electrodes to serve as a restrictor to control the geometric shape and spatial growth of the impulse.

In another aspect, a sparker source for use with a liquid medium is provided having a plurality of spaced electrodes, at least one of which is constructed to serve as an initiator electrode, and an electrical driver constructed to generate an initial, minor electrical discharge with at least one initiator electrode that assists enabling a subsequent main discharge between the electrodes.

According to this aspect of the invention, one or more of the following features may also be included: The main discharge may be adapted to generate an impulse of acoustic energy with a desired acoustic spectrum. The sparker source may be connected to a waste treatment system in which the liquid medium is waste material. The electrical driver may include an initiator circuit and a separate main discharge drive circuit, where the initiator circuit may enable the electrical driver to produce a lower voltage, efficient electrical discharge than would occur in the absence of the initiator circuit.

In yet another aspect, the invention features a method for producing an acoustic spectrum. The method includes creating an electrical discharge in an enclosure containing a liquid medium, the enclosure having a spring constant selected to enable production of a desired spectrum of acoustic energy.

Further aspects, features, and advantages will become apparent by the following.

BRIEF DESCRIPTION OF THE DRAWINGS

FIG. 3A is a cross sectional view of a semi-cylindrical enclosure with three sparkers.

FIG. 3B is an end view of the semi-cylindrical enclosure of FIG. 3A.

DESCRIPTION OF THE PREFERRED EMBODIMENTS

Figure 1:
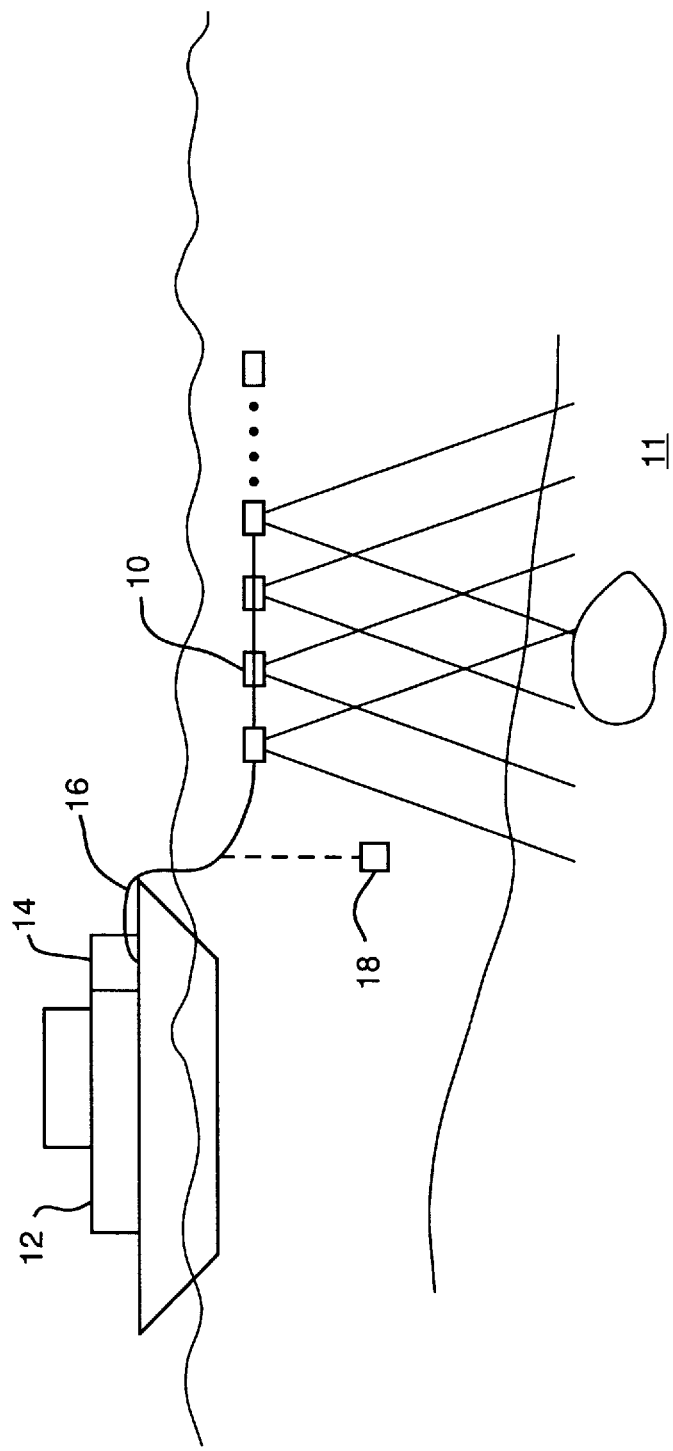
FIG. 1 is a schematic view of an array of sparker sources.

Shown in FIG. 1 is an array of sparkers 10 being towed with a cable 16 by a ship 12 for use in 3-D seismography. A ballast 18 is attached to cable 16 to keep the sparkers submerged. In the preferred embodiment, acoustic impulses reflect from features underneath the bottom 11 and are detected by other sensors not shown.

The array is arranged horizontally for many geophysical applications and vertically for surveillance, and at other possible orientations for shallow water characterization.

Figure 2:
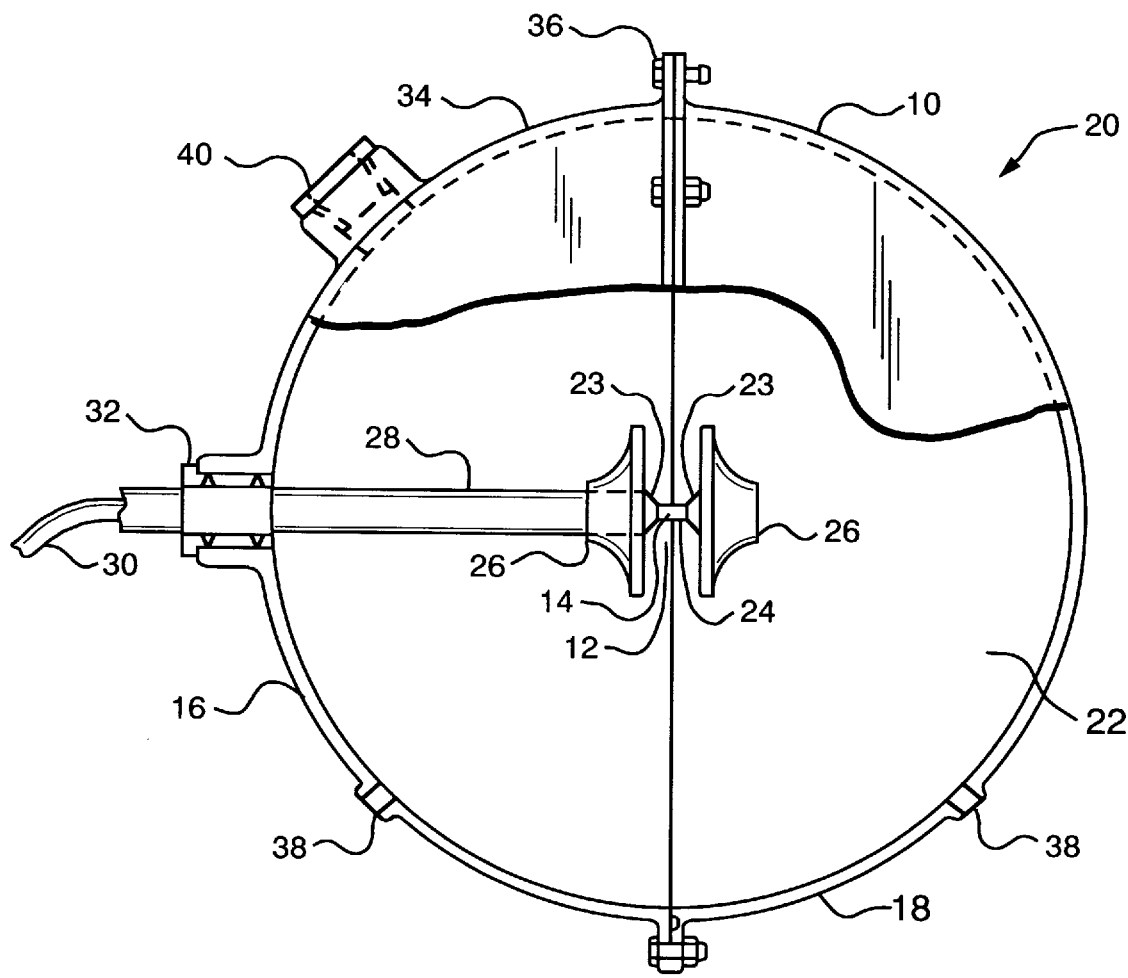
FIG. 2 is a cross sectional view of a spherical pod enclosing a cylindrical sparker with disc-shape restrictors.

Shown in FIG. 2 is a sparker source, constructed and arranged according to a novel design which advantageously facilitates control of the acoustic spectrum, and is highly efficient, compact, directional and uses low voltage to produce impulses in liquids.

Referring to FIG. 2, sparker 12 is enclosed in spherical pod 10. In this and subsequent figures, like reference numbers designate identical or corresponding parts. Pod 10 is a spherical shell with radius "R" 14, thickness "t" 16, made of an enclosure material 18 having a modulus of elasticity "E". The acoustic frequency is determined by a stiffness factor $K=tE/R^4$.

The pod's effect on the acoustic spectrum depends of the value of the spring constant "K". With a low spring constant (for example, lower than approximately ten, for discharged electrical energies of a few hundred joules), the pod serves to decrease the time between pressure peaks, which shifts the peak in the acoustic spectrum to a higher frequency. This produces an acoustic spectrum with a higher frequency content (as required by certain applications) associated with a particular acoustic source strength. Sparkers known in the art having the same acoustic strength produce a spectrum with a lower frequency (or, equivalently, produce a stronger acoustic waveform with the same frequency). In one example, impulsive acoustic sources known in the art produce a peak frequency of about eighty Hz and an acoustic energy of about 200 joules, whereas a sparker enclosed in a pod produces, with the same energy, a peak frequency of about two hundred Hz.

For high spring constants (higher than approximately one thousand), the effect of the pod is to produce a single long pressure pulse that both shifts the acoustic spectrum to a lower frequency and is very efficient in converting electrical energy (e.g., few tens of joules) into acoustic energy. Furthermore, the acoustic spectrum produced is independent of depth of the sparker, unlike other impulsive sources known in the art. This provides the capability to operate at low frequency with relatively low energy, whereas impulsive sources known in the art require relatively high energy to produce a low frequency. Furthermore, the depth independence eliminates the need for compensating the acoustic source when operated at different depths and the same spectrum is required. For example, a typical sparker known in the art, at a depth a depth of 600 feet and provided with 20 joules of electrical energy, the acoustic spectrum peaks between two and three kilohertz. A sparker, having the same energy, enclosed with a spring constant of about one hundred thousand, has a greater acoustic strength which peaks at about one hundred hertz, and the spectrum is essentially the same at all depths. For sparkers known in the art, changing the depth from one hundred to one thousand feet shifts the peak frequency by a factor of over five hundred percent. Also, for sparkers known in the art, submerged to a depth of 600 feet, to produce a spectrum with a peak at one hundred Hz would require about 300 kilojoules of electrical energy. Thus the pod provides the ability to choose the acoustic spectra and acoustic energy independent of one another, and provides a broadband acoustic source that is independent of depth.

The enclosure is designed to withstand the pressure generated by the sparker induced cavity expansion. A wide range of materials is feasible, depending on the application. When it is desired for the acoustic pulse to radiate external to the enclosure the material is chosen to match the impedance of the external medium 20 for efficient transmittal. When the enclosure volume 22 serves as a processing (for example, for water treatment) chamber and the acoustic pulse is to be retained within the enclosure, the material is chosen to have an impedance mismatch with the medium external to the pod to minimize losses through the walls. Plastics and composite materials are amenable to construction of enclosures (e.g., spherical shells) and have properties consistent with desired spring constants and can withstand pressures generated by the sparker. They also have a good acoustic impedance match with external fluids. Metallic enclosures are feasible for Large frequency increases and many have a high impedance mismatch with external fluids. With metallic materials care must be taken to electrically isolate the pod to prevent electrical interactions with the sparker.

Although FIG. 2 shows a pod shell made with a single material, pods with multiple layers can provide further spectral control and increase the mechanical integrity of the pod. Furthermore, in FIG. 2 the pod is shown to be filled with a liquid, however, the pod in other embodiments may be partially filled, providing another design feature to control the peak frequency.

In FIG. 2, the sparker 12 is shown with two electrodes 23 and a substrate 24. The electrical discharge occurs between the two electrodes and the electrical current return is through a conductor within the substrate. The restrictor 26 in FIG. 2 defines a cylindrical volume and forces the cavity produced by the discharge to expand and contract cylindrically. This prolongs the time of cavity expansion and contraction thereby narrowing the acoustic spectrum. The restrictors are designed to withstand the impulsive pressures and to allow the cavity to expand and collapse freely. The invention is understood to include other geometries implied by this concept. For instance, in other embodiments the electrodes in conjunction with a rectangular restrictor are designed to produce a linear discharge with linear (one-dimensional) cavity dynamics. Also, in another embodiment the invention includes mechanical representations in which the enclosure and restrictor constitute a single structure.

The sparker support 28 is shown as a tube that serves to center the sparker within the shell and enclose the electrical cable 30 that delivers the electrical power that initiates and drives the sparker. The support may have any arrangement that centers the sparker, and the support can serve to enclose additional elements such as wire for diagnostics, flow tubes in high repetition rate applications where electrode cooling may be required, and other housekeeping functions. The feedthru 32 provides a seal that prevents fluids from flowing at the interface with the sparker support 28, for embodiments in which the medium outside the pod 20 (gas, liquid or solid) is different from the liquid inside the pod. In FIG. 2 the sparker tube enters the shell through a hole in a hemisphere 34 that is sealed to the other hemisphere by plate seal attachments 36. This arrangement provides easy access to the enclosure which also includes access ports 38 and pump port 40. Other pod arrangements are included in the invention, such as an entire spherical shell with a feedthru 32 designed to allow removal of the sparker support 28 and sparker 12 from the pod 10. Ports 38 are employed to provide access for various housekeeping functions (for example, pressure relief valves or drain cocks). Depending on the application, a pump operating through the port 40 provides fluid flow to cool the interior, remove debris generated by the discharge or deliver liquid for treatment by the sparker. In such applications, one or more ports 38 handle the effluent.

The pod in certain embodiments have external attachments for deployment or are incorporated into an additional system, for example, a strut for moving through the water.

The sparker 12 is adapted to direct the impulse in a variety of directions for a number of applications. For example, if sparker 12 generates a signal in a particular direction, in some cases it is advantageous to dispose an acoustic reflecting material on a portion of the surface or around a portion of the enclosure 10, leaving an uncovered region to allow acoustic emission in the direction of interest. The use of a reflecting plate disposed at the outside of the sphere would produce a reflection so that the system would act like a dipole and provide the associated beam pattern. In processes that utilize light pulses, it is advantageous to dispose a light reflecting material on the inside of the enclosure 10. This material also serves to enhance chemical processes in certain applications. For example, a Teflon layer both reflects a large portion of incident light and assists in the destruction of organic contaminants.

A variety of geometrical arrangements of the shroud, pod enclosure and of the sparker electrode and electrical driver systems are understood to be within the scope of the invention.

Illustrated in FIGS. 3A and 3B are multiple sparker impulsive sources in a cylindrical pod arrangement. Additional advantageous results are realized with multiple sparkers arranged in series electrically and with a reflector to increase the impulse in a preferred direction or to utilize otherwise wasted energy.

Referring to FIG. 3A, three sparkers in series 44 provide an efficient and compact system since the effective electrical resistance is greater than for a single sparker, and the system has a singe electrical driver instead of an electrical driver for each sparker. The invention is intended to encompass any number of sparkers in various arrangements. Multiple sparker sources are able to produce a larger total impulse and process larger quantities waste, for example. In the representation in FIG. 3A the sparker system is a three element array 44 that provides directional acoustic emission. An acoustic reflector 46 increases the acoustic emission through the acoustic window 48.

The representation in FIG. 3A exhibits different spectral control for different sparkers. A wall 50 defines a separate volume 52 so that the peak frequency associated with the sparker on the right is different from the other two sparkers. Also because of the shroud, its associated spectral shape is different. Various other combinations of sparkers, shrouds and defined volumes are included in the invention. For instance, some sparkers may have separate pods or no pods at all.

The sparker source in FIGS. 3A and 3B has many of the same elements as illustrated in FIG. 2, as indicated by the same numbers. In addition, the cylindrical enclosure has a support rod 54 for mechanical strength and end caps 56 to facilitate access.

Figure 4:
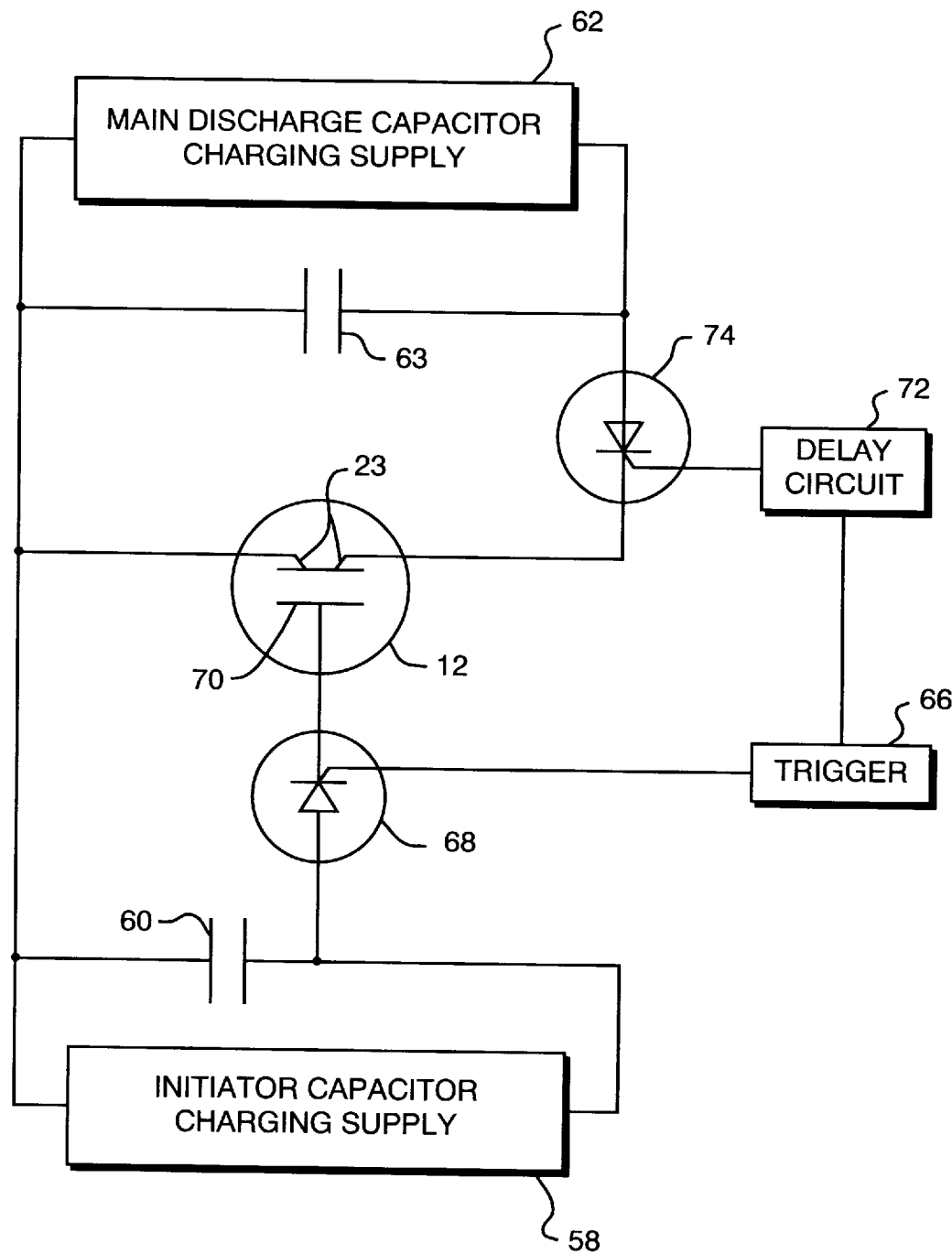
FIG. 4 is a schematic illustration of a circuit diagram for a triaxial electrode configuration.

FIG. 4 illustrates an advantageous embodiment of the electrical system of the present invention. In this embodiment the circuit for the initiator is separate from the main electrical driver circuit. The initiator circuit has a power supply 58 that charges up an initiator pulse-forming network, represented as a single capacitor 60. Similarly, the main discharge circuit has a power supply 62 that charges up the driver pulse-forming network, also represented as a single capacitor 63. Trigger 66 sends a pulse that closes the initiator switch 68 so that the initiator discharges into the sparker. The initiation pulse is applied to an initiator electrode 70 that is distinct from the main electrodes 23, although in an alternate embodiment the initiator electrode is one of the main electrodes. In this embodiment the delay between the initiation and main discharge can be controlled by placing and inductor between the main discharge capacitor 63 and the initiator capacitor 60, thereby eliminating the delay circuit 72 and initiator switch 68. The initiation discharge disturbs the region between the main discharge electrodes. The delay circuit 72 allows the initiation to complete before the main discharge switch 74 is closed and the main discharge pulse forming network 63 is discharged into the sparker 12 to produce the impulse. Since the circuit diagram in FIG. 4 is a schematic, it implicitly contains various functions known to those trained in the art. These include, for example, electrical isolation between pulse-forming networks, safety switches and diodes, snubber networks, etc., necessary for operation of the electrical circuits.

Having two power supplies allows the initiator and main discharge to be charged to different voltages. In implementations in which the initiator and main discharge have the same voltage, a single power supply is employed with appropriate controls and switches for charging and then isolating the two pulse forming networks. Furthermore, the pulse-forming networks have in certain embodiments "freewheeling" diodes that prevent positive and negative swings in the electrical discharge, that is, they maintain the polarity of the discharge. This aids in the initiation and production of the impulse. Furthermore, in implementations in which the initiator electrode is one of the main electrodes, a peaking capacitor, separated from the main capacitor by an inductor, can serve as the initiator.

The trigger and delay circuit is non-specific, and any electrical control circuit that serves to trigger the switches at the appropriate times is to be understood within the scope of the invention.

Although the charging voltages of the initiator and main discharge can have any value, in a particularly preferred embodiment the voltages of both are in the range from a few hundred volts to ten kilovolts. This provides advantages in practical implementations requiring small volume and weight. This low voltage, low energy initiation is particularly efficacious in high conductivity fluids, since when using standard single circuit discharges in these fluids, the initiation energy is quite large resulting in large losses which makes the single circuit discharge difficult to implement.

An alternate implementation of the initiator employs a constant direct current (DC) between the two main discharge electrodes. In this case the initiator voltage is small, provided, for example, by a battery bank with an output voltage from a few to a few tens of volts. The main discharge remains a pulsed discharge, and is isolated from the DC circuit.

Figure 5:
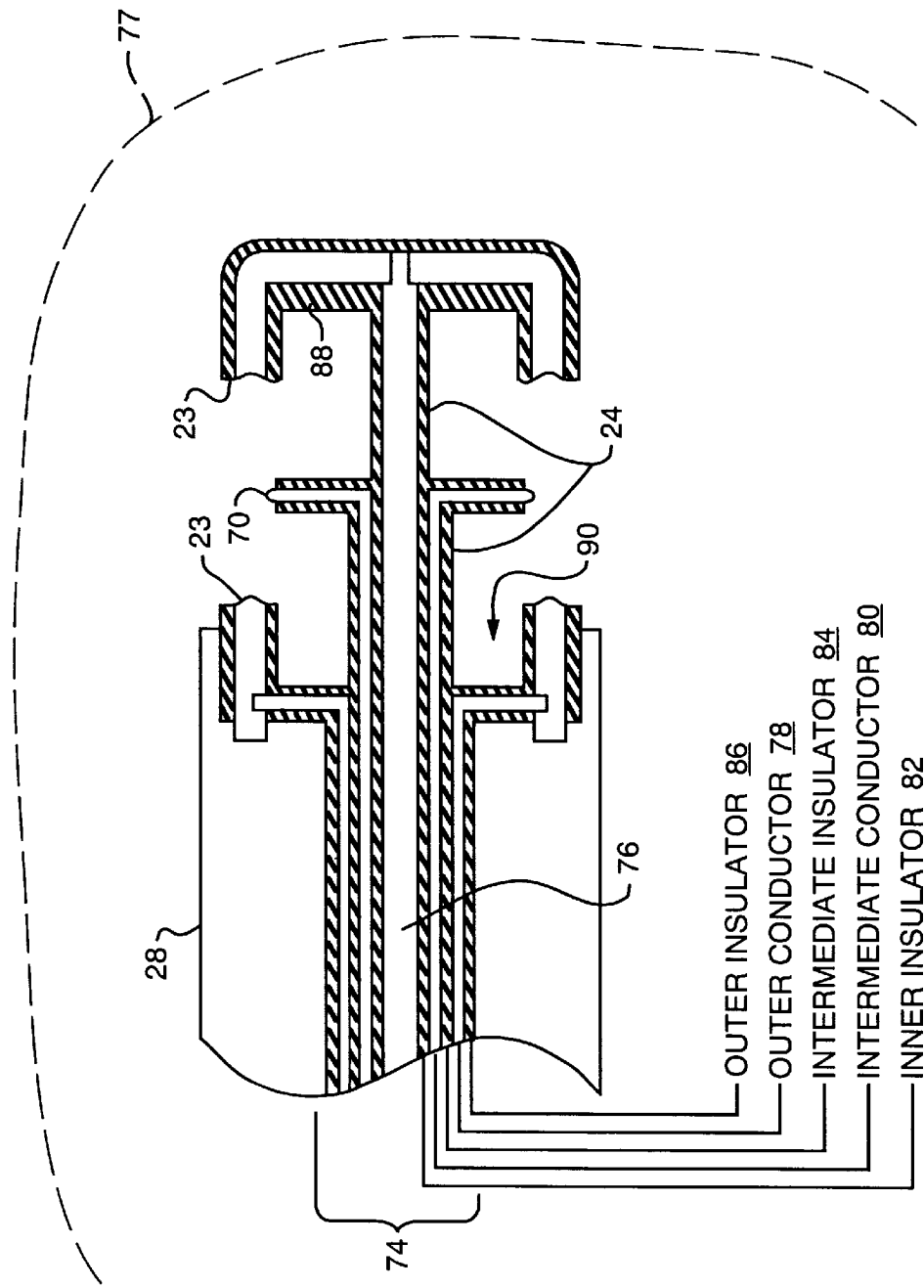
FIG. 5 is a cross sectional view of a cylindrical triaxial electrode configuration.

For the pulsed initiator described in reference to FIG. 4, a large reduction in required initiation energy is realized with a triaxial electrode configuration as illustrated in FIG. 5.

In this representation the initiator electrode 70 is midway between the two main electrodes 23. The initiation discharge produces a disturbance that expands away from initiator electrode 70 to main electrodes 23. The use of a third electrode located between the two main electrodes results in a large reduction in initiation energy since the initiation energy required to span a gap is a strong function of the electrode separation. For many situations the initiation energy depends on the fifth power of the electrode separation. In this instance, the third electrode reduces the initiation energy by about a factor of thirty two. Also, in another embodiment the initiator electrode has a sharp edge that produces a corona to aid the initiation.

A preferred triaxial configuration exhibited in FIG. 5 has a cylindrical geometry. In the representation in FIG. 5 the sparker is an extension of commercially available triaxial cable 74. In some implementations, the sparker is enclosed in an enclosure 77, while in other implementations the sparker is used without an enclosure. The main electrodes 23 are connected to the inner 76 and outer 78 conductors of the triaxial cable. The initiator electrode 70 is connected to the intermediate conductor 80 of the triaxial cable. The substrate 24 has two sections, one attached to the inner insulator 82 and the other to the intermediate insulator 84. The outer insulator 86 extends to cover the main electrode, and additional insulators 88 are applied to other exposed conducting material. The insulation 86 protects the cable electrically and an additional sparker support 28 provides mechanical support. The sparker electrode and insulator materials, in general, may be different from that of the triaxial cable, depending on practical requirements such as required lifetimes. The electrodes 23 and 70 are shown with a space 90 between the electrodes and substrate 24, in contrast to the electrodes shown in FIGS. 2 and 3. The provision of space 90 reduces substrate erosion and thus prolong operational lifetime of the electrode system. The invention is also understood to include configurations with no spacings, for example, in which the sparker 12 (FIG. 2) is simply an extension of a triaxial cable with insulator material 82 and 84 removed exposing conductor material 76, 78, and 80 so that 76 and 78 become the main electrodes 23 (of FIG. 2) and 80 becomes the initiator electrode 70.

Other triaxial configurations are understood to be included in this invention. An example is an annular geometry in which the sparker discharges radially between three circular electrodes that in the preferred arrangement are concentric. Also, configurations with additional electrodes to extend the effective gap length between main electrodes is understood to be within the scope of the invention. In any geometry a restrictor 26 can be an extension of the prevailing geometry or a different geometry.

Figure 6:
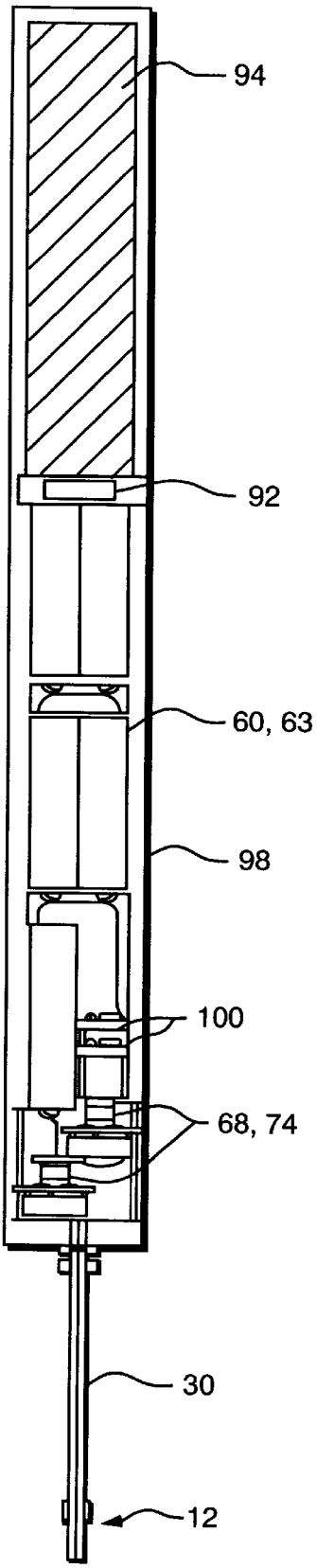
FIG. 6 is a cross sectional view of a single sparker with an adjacent power system.

In FIG. 6 a single sparker 12 is shown with the entire power system located in a buoy type enclosure 92 adjacent to the sparker 12. In this embodiment a battery 94 provides the electrical power distribution 96 to two capacitor sections 60 and 63 mounted on a support structure 98, with two trigger control cards 100 and two switches 68 and 74, corresponding to the low initiation energy concept described above in reference to FIG. 4. Because the capacitor sections 60 and 63 are adjacent to the sparker 12, electrical cable 30 losses are minimized and the risetime of the electrical power pulse is minimized (by minimizing the cable contribution to the circuit inductance). This embodiment provides a compact unit for use alone, as in sonobuoys or submarine countermeasures, or in an array. In an alternate embodiment, in which sparker units are towed, either singly or in an array, the electrical power is provided by a ship. In this embodiment the battery and power distribution system would not be part of the in-water unit. The ship's power system 14 (FIG. 1) charges the capacitor sections and controls the time and sequencing of the pulse power firings of the sparker in the water. This reduces the size of the in-water unit, which is advantageous for towing in some applications. The sparker (12) in FIG. 6 is shown to be a standard type of sparker. The invention is understood to include any combination of the novel embodiments of this invention.

What is claimed is:

1. A sparker source for use with a liquid medium, the sparker source comprising:
    a plurality of spaced electrodes,
    an electrical driver constructed to generate electrical discharges in the medium between said electrodes, each discharge adapted to generate an impulse of acoustic energy, and
    an enclosure having a spring constant defining the rigidity of said enclosure, said enclosure constructed to enclose said electrodes and said liquid medium to control the acoustic spectrum of said impulse.

2. The sparker source of claim 1 including an initiator electrode constructed to initiate said discharge between said electrodes.

3. The sparker source of claim 1 including a nonconducting substrate disposed between said electrodes to provide a surface along which said discharge occurs.

4. The sparker source of claim 1 wherein said sparker source is adapted for submersion in a second liquid medium.

5. The sparker source of claim 4 wherein said enclosure fully enclosed the electrodes and is sealed to isolate the liquid medium inside said enclosure from said second liquid medium.

6. The sparker source of claim 4 wherein said enclosure is constructed to have an acoustic impedance matched to said second liquid medium.

7. The sparker source of claim 4 wherein said enclosure is constructed to have an acoustic impedance mismatched to said second liquid medium.

8. The sparker source of claim 1 wherein said spring constant of said enclosure is between 0.1 and 10,000,000.

9. The sparker source of claim 8 wherein said spring constant is between 1 and 100.

10. The sparker source of claim 8 wherein said spring constant is between 100 and 10,000.

11. The sparker source of claim 8 wherein said spring constant is between 10,000 and 10,000,000.

12. The sparker source of claim 11 wherein said acoustic spectrum is independent of any external pressure imposed on said enclosure by a fluid in which said sparker source is immersed.

13. The sparker source of claim 11 wherein said enclosure enables said sparker source to operate at lower acoustic frequency and lower energy than would occur in the absence of said enclosure.

14. The sparker source of claim 1 wherein said electrical driver comprises an initiator circuit and a separate discharge drive circuit.

15. The sparker source of claim 14 wherein said initiator circuit enables said electrical driver to produce a lower voltage, efficient electrical discharge than would occur in the absence of said initiator circuit.

16. The sparker source of claim 14 wherein said liquid medium in which said electrodes are immersed is a high electrical conductivity liquid medium.

17. The sparker source of claim 1 wherein said electrical driver is located adjacent to said electrodes.

18. The sparker source of claim 1 wherein said enclosure is a spherical pod.

19. The sparker source of claim 1 wherein said enclosure is cylindrical.

20. The sparker source of claim 1 including a plurality of sets of electrodes.

21. The sparker source of claim 1 including a reflector arranged with the enclosure, said reflector constructed to direct said acoustic energy in a desired direction.

22. The sparker source of claim 1 in which said enclosure includes a light-transmissive window constructed to transmit light produced by said discharge.

23. The sparker source of claim 22 including a reflector to direct said light in a desired direction.

24. The sparker source of claim 1 including a plurality of enclosures, each of which encloses at least a pair of said plurality of electrodes.

25. The sparker source of claim 1 or 24 wherein at least one enclosure is adapted to enclose a compliant medium.

26. The sparker source of claim 25 including at least one restrictor disposed in the vicinity of said electrodes to control the geometric shape and spatial growth of the impulse produced by the electrodes.

27. The sparker source of claim 25 wherein at least one enclosure is constructed and arranged with respect to said electrodes to serve as a restrictor to control the geometric shape and spatial growth of said impulse.

28. A sparker source for use with a liquid medium, the sparker source comprising:
    a plurality of spaced electrodes, at least one of which is constructed to serve as an initiator electrode, and
    an electrical driver constructed to generate an initial, minor electrical discharge with said at least one initiator electrode that assists enabling a subsequent main discharge between said electrodes.

29. The sparker source of claim 28 wherein said main discharge is adapted to generate an impulse of acoustic energy with a desired acoustic spectrum.

30. The sparker source of claim 28 connected to a waste treatment system in which said liquid medium is waste material.

31. The sparker source of claim 28 wherein said electrical driver comprises an initiator circuit and a separate main discharge drive circuit.

32. The sparker source of claim 31 wherein said initiator circuit enables said electrical driver to produce a lower voltage, efficient electrical discharge than would occur in the absence of said initiator circuit.

33. A sparker source for use with a liquid medium, the sparker source comprising:
    a plurality of spaced electrodes,
    an electrical driver constructed to generate electrical discharges in the medium between said electrodes, each discharge adapted to generate an impulse of acoustic energy,
    at least one restrictor disposed in the vicinity of said electrodes to control the geometric shape and spatial growth of the impulse produced by the electrodes, and an enclosure having a spring constant defining the rigidity of said enclosure, said enclosure constructed to enclose said electrodes and said liquid medium to control the acoustic spectrum of said impulse.

34. A sparker source for use with a liquid medium, the sparker source comprising:

a plurality of spaced electrodes, at least one of which is constructed to serve as an initiator electrode, an electrical driver constructed to generate an initial, minor electrical discharge with said at least one initiator electrode that assists enabling a subsequent main discharge between said electrodes, and an enclosure having a spring constant defining the rigidity of said enclosure, said enclosure constructed to enclose said electrodes and said liquid medium to control the acoustic spectrum of said impulse.

35. A sparker source for use with a liquid medium, the sparker source comprising:

a plurality of spaced electrodes, at least one of which is constructed to serve as an initiator electrode, an electrical driver constructed to generate an initial, minor electrical discharge with said at least one initiator electrode that assists enabling a subsequent main discharge between said electrodes, at least one restrictor disposed in the vicinity of said electrodes to control the geometric shape and spatial growth of the impulse produced by the electrodes, and an enclosure having a spring constant defining the rigidity of said enclosure, said enclosure constructed to enclose said electrodes and said liquid medium to control the acoustic spectrum of said impulse.

36. A method to produce an acoustic spectrum, the method comprising:

creating an electrical discharge in an enclosure containing a liquid medium, said enclosure having a spring constant selected to enable production of a desired spectrum of acoustic energy.

* * * * *